F. EVANS.
ATTACHMENT FOR PLOWS.
APPLICATION FILED JUNE 6, 1908.

900,992.

Patented Oct. 13, 1908.

WITNESSES

INVENTOR
FRANK EVANS
BY
HIS ATTORNEYS

UNITED STATES PATENT OFFICE.

FRANK EVANS, OF MINNEAPOLIS, MINNESOTA.

ATTACHMENT FOR PLOWS.

No. 900,992.　　　Specification of Letters Patent.　　　Patented Oct. 13, 1908.

Application filed June 6, 1908. Serial No. 437,155.

*To all whom it may concern:*

Be it known that I, FRANK EVANS, of Minneapolis, Hennepin county, Minnesota, have invented certain new and useful Improvements in Attachments for Plows, of which the following is a specification.

The object of my invention is to provide means to prevent a plow point from coming in contact with a stone or other obstruction in the ground that would tend to break or damage the point, the device being applicable to plows of the sulky and gang type.

The invention consists generally in suitable mechanism actuated by contact of the plow colter with an obstruction for raising the plow beam and point.

Figure 1:
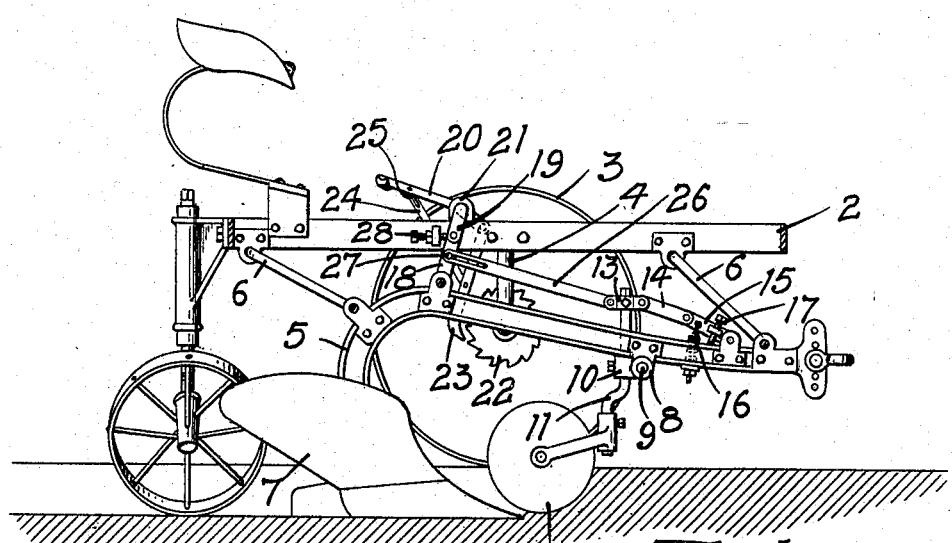
Figure 2:
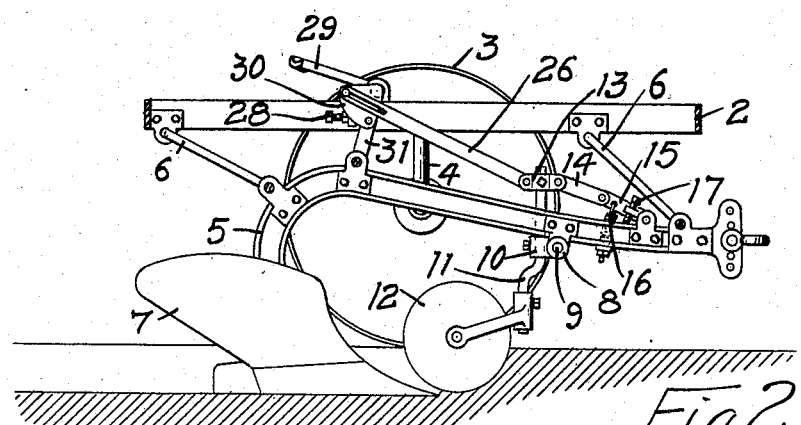
Figure 3:
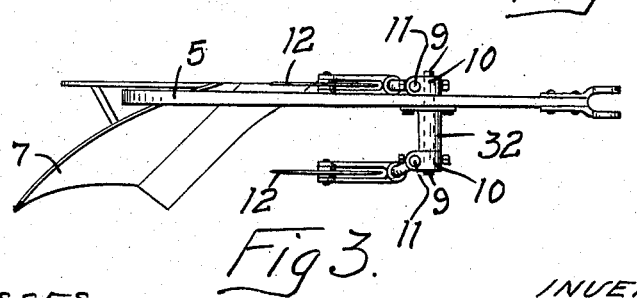

In the accompanying drawings, forming part of this specification, Figure 1 is a side elevation of a sulky plow with my invention applied thereto. Fig. 2 is a similar view illustrating a modified construction. Fig. 3 is a plan view illustrating another modification.

In the drawing, 2 represents a frame of a plow, 3 a carrying wheel and 4 a portion of the axle.

5 is the plow beam connected by links 6 with the frame 2 and provided with the plow 7 of ordinary construction.

8 is a bracket secured to the beam and 9 a rock shaft mounted therein transversely of the beam and having a bearing 10 for a rod 11, on the lower end of which a wheel colter 12 is mounted.

The upper end of the rod 11 extends above the beam and has an adjustable connection with a link 13 that is pivotally connected at one end by links 14 and 15 with the beam 5. A spring 16 connects the link 15 with the beam and normally tends to straighten the toggle joint formed by the links 14 and 15. A set screw 17 is carried by the link 15 and engages the top of the beam and limits the movement of the link 15 toward the beam. The rear portion of the beam is connected by a toggle link 18 with an arm 19 carried by a lever 20 that is mounted at 21 on the frame 2. A ratchet wheel 22 is secured to the hub of the wheel 3 and a dog 23 is pivoted on one end of the lever 20 in position to engage the teeth of the ratchet. A link 24 connects the said dog with the lever 20 on the other side of the pivot of said lever from its connection with the dog 23, said link 24 having a slotted connection 25 with said lever. When the lever 20 is depressed by the foot of the driver the dog will be thrown into engagement with the teeth of the ratchet and the plow beam will be raised. This is the ordinary horse lift in general use and I make no claim to the same broadly herein. A bar 26 is pivotally connected at one end to the link 13 and has a slotted connection 27 at its other end with the toggle link 18.

The operation of the device is as follows:— If the colter strikes a stone or other obstruction which would be likely to damage the plow point the shaft 9 is rocked, swinging the upper end of the rod 11 forward and breaking the toggle joint against the tension of the spring 16. The forward movement of the rod will exert a lengthwise strain on the bar 26, break the toggle joint formed by the link 18 and the arm 19, depress the foot lever and throw the dog 23 into engagement with the teeth of the ratchet wheel, whereupon the plow beam and its point will be raised out of the ground. An adjusting screw 28 is preferably provided for the purpose of limiting the backward movement of the links 18 and rendering the toggle joint at that point more or less sensitive, as desired.

In Fig. 2 I have illustrated a modified construction which consists in providing a foot-operated lever or treadle 29 with a quadrant plate 30 that is connected by a link 31 with the plow beam. The bar 26 is attached to this plate in position to allow the beam to be normally locked against upward movement. When, however, the colter strikes a stone or other obstruction the plate 30 will be oscillated, breaking the joint formed by the link 31 and the plate and causing the beam to be lifted as the plate 30 is swung on its support. In other respects the mechanism is the same as that described with reference to Fig. 1.

In Fig. 3 I have illustrated another modification which consists in extending the shaft 9 laterally in a hub 32 and employing two colters thereon instead of one arranged on opposite sides of the beam with a space between them. These colters move in advance of the plow and effectually protect the full width of the plow. Only one upright rod need be employed with this construction as both colters are secured on the shaft and will be oscillated by the engagement of either one with an obstruction.

I do not wish to be confined in this application to the specific mechanism employed and actuated by the contact of the colter with an obstruction, as in various ways this mechanism may be modified without departing from the spirit of my invention.

I claim as my invention:

1. The combination, with a plow beam and plow point carried thereby, of a colter arranged to travel in advance of the plow point and mechanism actuated by contact of the colter with an obstruction, for raising said beam and point.

2. The combination, with a plow beam and plow point carried thereby, of a colter arranged to travel in advance of the plow point, and a toggle mechanism connected with said colter and actuated by contact of the colter with an obstruction for raising said beam and point.

3. The combination, of a plow beam and a plow point carried thereby, of a colter arranged to travel in advance of the plow point, a rod having a rocking bearing on said beam, a toggle mechanism provided in connection with the upper end of said rod and a lifting device rendered operative by the movement of said rod and the interlocking of said toggle mechanism.

4. The combination, with a plow beam and plow carried thereby, of a colter arranged to travel in advance of the plow, a rock shaft journaled on said beam transversely thereto, a rod secured on said shaft and whereon said colter is mounted, toggle links connecting the upper end of said rod with the forward portion of said beam, a beam lift mechanism including a ratchet and dog, and means operatively connecting said rod and toggle mechanism with said dog for moving it into engagement with said ratchet when said colter strikes an obstruction.

5. The combination, with a plow beam and plow carried thereby, of a colter arranged to travel in advance of the plow, a shaft journaled transversely on said beam, a rod secured on said shaft and whereon said colter is mounted, toggle links connecting the upper end of said rod with the forward portion of said beam, a spring for normally holding said toggle links in their locked position, and mechanism arranged to be rendered operative by the oscillation of said rod and the interlocking of said toggle links for raising said beam and plow, substantially as described.

6. The combination with a plow beam and plow carried thereby, of a colter a rod carried by said beam and whereon said colter is mounted, toggle links connecting the upper end of said rod with the forward portion of said beam, a beam lift mechanism including a ratchet and dog connected with the plow wheel and a bar attached to said toggle mechanism and having a sliding connection with said dog for moving it into engagement with said ratchet when said colter strikes an obstruction, substantially as described.

In witness whereof, I have hereunto set my hand this 29th day of May 1908.

FRANK EVANS.

Witnesses:
RICHARD PAUL,
J. A. BYINGTON.